United States Patent
Khakhalev (10) Patent No.: US 8,695,867 B2
(45) Date of Patent: Apr. 15, 2014

(54) ULTRASONIC WELDING MACHINE AND METHOD OF ASSEMBLING THE ULTRASONIC WELDING MACHINE

(75) Inventor: Alex Khakhalev, San Diego, CA (US)

(73) Assignee: LG Chem, Ltd., Seoul (KR)

( * ) Notice: Subject to any disclaimer, the term of this patent is extended or adjusted under 35 U.S.C. 154(b) by 31 days.

(21) Appl. No.: 13/222,601

(22) Filed: Aug. 31, 2011

(65) Prior Publication Data
US 2013/0048698 A1 Feb. 28, 2013

(51) Int. Cl.
*B23K 20/00* (2006.01)
*B23K 20/10* (2006.01)

(52) U.S. Cl.
USPC ........ 228/1.1; 228/110.1; 228/111; 156/73.1; 156/580.1; 156/580.2

(58) Field of Classification Search
USPC ............ 228/110.1, 1.1, 111; 156/73.1, 580.1, 156/580.2
See application file for complete search history.

(56) References Cited

U.S. PATENT DOCUMENTS

| | | | | |
|---|---|---|---|---|
| 3,140,859 | A | * | 7/1964 | Scarpa ........................ 366/114 |
| 4,294,392 | A | | 10/1981 | Colloff |
| 4,767,492 | A | | 8/1988 | Fukusima et al. |
| 5,357,423 | A | | 10/1994 | Weaver et al. |
| 5,371,337 | A | | 12/1994 | Campbell et al. |
| 5,603,444 | A | | 2/1997 | Sato |
| 5,919,539 | A | | 7/1999 | Bisbis et al. |
| 6,150,753 | A | * | 11/2000 | DeCastro ...................... 310/334 |
| 6,736,942 | B2 | | 5/2004 | Weihs et al. |
| 6,821,367 | B1 | | 11/2004 | Macdonald et al. |
| 7,600,664 | B2 | | 10/2009 | Dieterle et al. |
| 7,828,190 | B2 | | 11/2010 | Saito et al. |
| 8,177,878 | B2 | | 5/2012 | Heinrich et al. |
| 8,403,019 | B2 | | 3/2013 | Khakhalev |
| 8,517,078 | B1 | | 8/2013 | Johnston et al. |
| 2002/0031603 | A1 | | 3/2002 | Miyamoto et al. |
| 2004/0023108 | A1 | | 2/2004 | Nakanishi et al. |

(Continued)

FOREIGN PATENT DOCUMENTS

| JP | 6114658 A | 4/1994 |
|---|---|---|
| JP | 7009169 A | 1/1995 |

(Continued)

OTHER PUBLICATIONS

U.S. Appl. No. 13/222,492, filed Aug. 31, 2011 entitled Interconnection Assemblies and Methods for Forming the Interconnection Assemblies in a Battery Module.

(Continued)

*Primary Examiner* — Erin Saad
(74) *Attorney, Agent, or Firm* — Buckert Patent & Trademark Law Firm, P.C.; John F. Buckert (57) ABSTRACT

An ultrasonic welding machine and method are provided. The machine includes a base portion having a first aperture that defines first internal threads. The machine further includes an electrically non-conductive member disposed on the base portion having a second aperture that is aligned with the first aperture. The machine further includes an anvil portion disposed on the electrically non-conductive member having a third aperture that is aligned with the second aperture. The machine further includes a first bolt disposed through the third aperture and the second aperture that is threadably received in the first internal threads, and the first bolt and the anvil portion are electrically isolated from the base portion.

9 Claims, 7 Drawing Sheets

(56) References Cited

U.S. PATENT DOCUMENTS

| | | |
|---|---|---|
| 2004/0247931 A1 | 12/2004 | Weihs et al. |
| 2005/0202311 A1 | 9/2005 | Higashino et al. |
| 2006/0174994 A1 | 8/2006 | White |
| 2006/0225842 A1* | 10/2006 | Darcy et al. .............. 156/580.1 |
| 2007/0257087 A1 | 11/2007 | Klinstein et al. |
| 2009/0111015 A1 | 4/2009 | Wood et al. |
| 2009/0255979 A1 | 10/2009 | Saito et al. |
| 2009/0297892 A1 | 12/2009 | Ijaz et al. |
| 2009/0297942 A1 | 12/2009 | Jang et al. |
| 2010/0038409 A1 | 2/2010 | Wilden et al. |
| 2010/0276086 A1 | 11/2010 | Oblak et al. |
| 2010/0281681 A1 | 11/2010 | Rourke et al. |
| 2011/0108181 A1 | 5/2011 | Cai et al. |
| 2011/0114705 A1 | 5/2011 | Matis |
| 2011/0117420 A1 | 5/2011 | Kim et al. |
| 2011/0284169 A1 | 11/2011 | Khakhalev |
| 2011/0287300 A1 | 11/2011 | Byun et al. |
| 2011/0293992 A1 | 12/2011 | Hsu et al. |
| 2011/0300438 A1 | 12/2011 | Khakhalev |
| 2011/0308736 A1 | 12/2011 | Scheuerman et al. |
| 2012/0052364 A1 | 3/2012 | Khakhalev |
| 2012/0111924 A1 | 5/2012 | Makita et al. |
| 2012/0153006 A1 | 6/2012 | Koetting et al. |
| 2012/0158168 A1 | 6/2012 | Khakhalev |
| 2012/0180929 A1 | 7/2012 | Koetting et al. |
| 2013/0042959 A1 | 2/2013 | Khakhalev et al. |
| 2013/0048698 A1 | 2/2013 | Khakhalev |

FOREIGN PATENT DOCUMENTS

| | | |
|---|---|---|
| JP | 2003165161 A | 6/2003 |
| JP | 2005503265 A | 2/2005 |
| JP | 2006212692 A | 8/2006 |
| JP | 2009090364 A | 4/2009 |
| KR | 20070104904 A | 10/2007 |
| KR | 20070109929 A | 11/2007 |
| KR | 102010099652 | 9/2010 |
| WO | 9701432 A | 1/1997 |

OTHER PUBLICATIONS

U.S. Appl. No. 13/213,416, filed Aug. 19, 2011 entitled Ultrasonic Welding Machine and Method of Aligning an Ultrasonic Welding Horn Relative to an Anvil.

International Search Report for International Application No. PCT/KR2011/003497 dated Jan. 9, 2012.

International Search Report for International Application No. PCT/KR2012/006222 dated Feb. 1, 2013.

* cited by examiner

ULTRASONIC WELDING MACHINE AND METHOD OF ASSEMBLING THE ULTRASONIC WELDING MACHINE

BACKGROUND

During ultrasonic welding of a battery cell to interconnect member, the battery cell may output an electrical potential. If a portion of an ultrasonic welding machine comes in contact with opposite cell tabs of a battery cell, a short-circuit condition can occur which may degrade operation of the ultrasonic welding machine.

The inventor herein has recognized a need for an improved ultrasonic welding machine and method that minimizes and/or eliminates the above-mentioned deficiency.

SUMMARY

An ultrasonic welding machine in accordance with an exemplary embodiment is provided. The ultrasonic welding machine includes a base portion having a first aperture extending therein that defines first internal threads. The ultrasonic welding machine further includes an electrically non-conductive member disposed on the base portion. The electrically non-conductive member has a second aperture extending therethrough that is aligned with the first aperture. The ultrasonic welding machine further includes an anvil portion disposed on the electrically non-conductive member. The anvil portion has a third aperture extending therethrough that is aligned with the second aperture. The ultrasonic welding machine further includes a first electrically non-conductive tubular portion configured to be received in the third aperture. The ultrasonic welding machine further includes a first bolt configured to be received through the third aperture and the first electrically non-conductive tubular portion and the second aperture such that a portion of the first bolt is threadably received in the first internal threads of the base portion, and the first bolt and the anvil portion are electrically isolated from the base portion.

A method for assembling an ultrasonic welding machine in accordance with another exemplary embodiment is provided. The method includes providing a base portion, an electrically non-conductive member, an anvil portion, a first electrically non-conductive tubular portion, and a first bolt. The base portion has a first aperture extending therein that defines first internal threads. The electrically non-conductive member has a second aperture extending therethrough. The anvil has a third aperture extending therethrough. The method includes disposing the electrically non-conductive member on the anvil such that the second aperture is aligned with the first aperture. The method further includes disposing the anvil portion on the electrically non-conductive member such that the third aperture is aligned with the second aperture. The method further includes disposing the first electrically non-conductive tubular portion in the third aperture. The method further includes disposing the first bolt through the third aperture and the first electrically non-conductive tubular portion and the second aperture such that a portion of the first bolt is threadably received in the first internal threads of the base portion, and the first bolt and the anvil portion are electrically isolated from the base portion.

DETAILED DESCRIPTION

Referring to FIGS. 1-5, an ultrasonic welding machine 10 in accordance with an exemplary embodiment is provided. In one exemplary embodiment, the ultrasonic welding machine 10 is utilized to ultrasonically weld interconnect members 20 to cell tabs 22 of a battery module 24. The ultrasonic welding machine 10 includes a mounting member 38, a base portion 40, an electrically non-conductive member 50, an anvil portion 60, electrically non-conductive tubular portions 70, 72, 74, 76, electrically non-conductive washers 90, 92, 94, 96, bolts 100, 102, 104, 106, and an ultrasonic welding horn 107.

Figure 2:
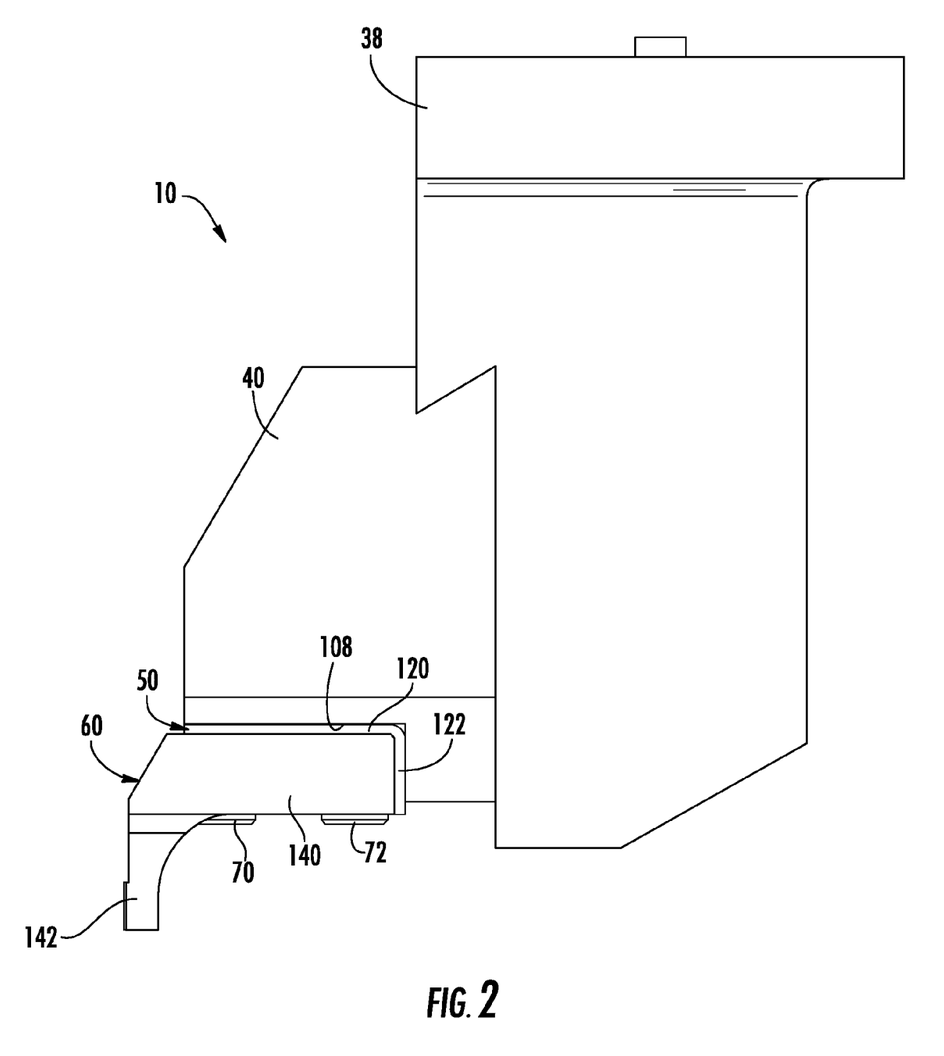
FIG. 2 is a side view of a portion of the ultrasonic welding machine of FIG. 1.
Figure 3:
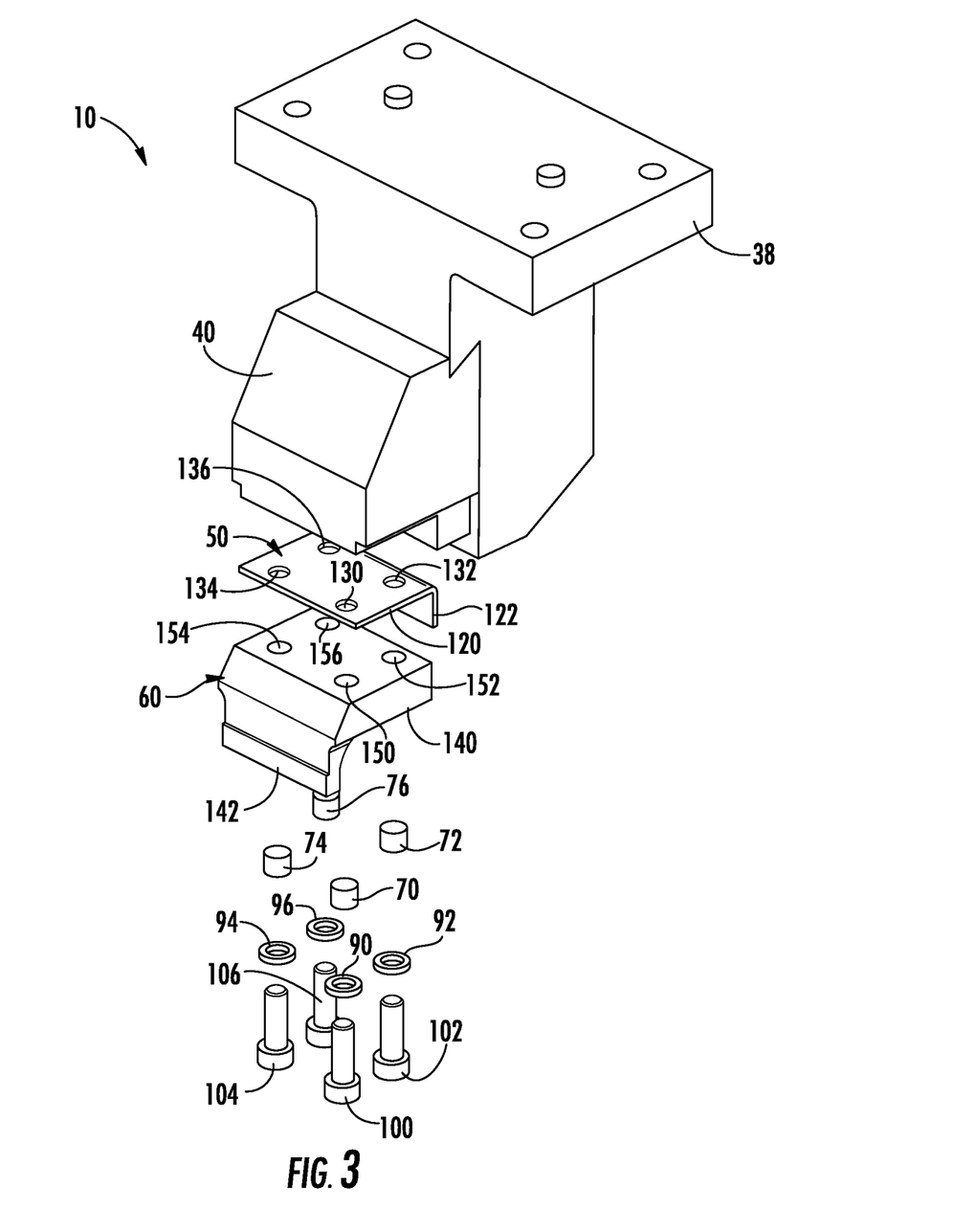
FIG. 3 is an exploded view of a portion of the ultrasonic welding machine of FIG. 1.
Figure 4:
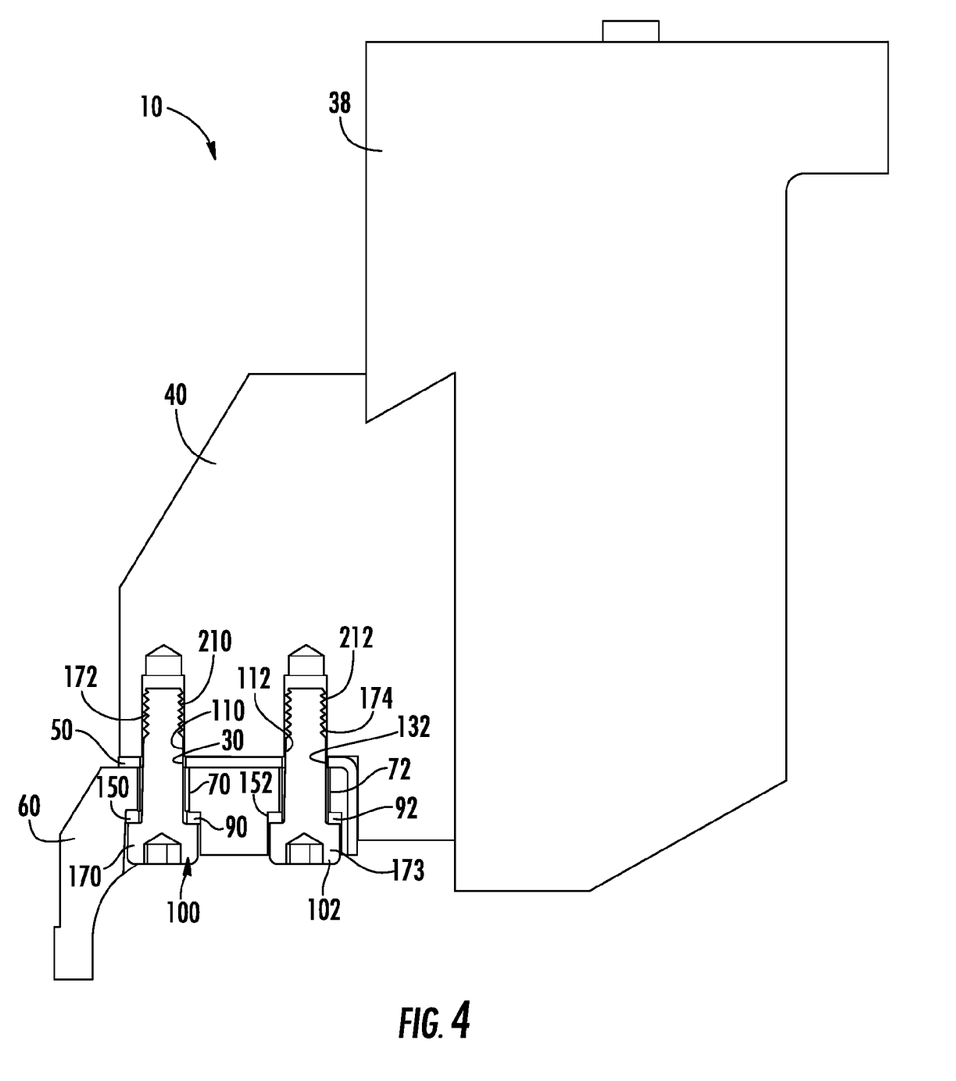
FIG. 4 is a bottom view of a portion of an anvil portion utilized in the ultrasonic welding machine of FIG. 3.

Referring to FIGS. 2-4, the base portion 40 is fixedly coupled to the mounting member 38. In one exemplary embodiment, both the base portion 40 and the mounting member 38 are constructed of steel. The base portion 40 includes a mounting surface 108 for receiving the electrically non-conductive member 50 thereon. The base portion 40 further includes apertures 110, 112, 114, 116 (shown in FIG. 5) extending therein. Each of the apertures 110, 112, 114, 116 define internal threads for threadably receiving portions of the bolts 100, 102, 104, 106, respectively, therein.

The electrically non-conductive member 50 is provided to electrically isolate the anvil portion 60 from the base portion 40. In one exemplary embodiment, the electrically non-conductive member 50 includes plate portions 120, 122. The plate portion 122 extends substantially perpendicular to the plate portion 120. Further, in an exemplary embodiment, the electrically non-conductive member 50 is constructed of plastic. Of course, in an alternative embodiment, the member 50 could be constructed of other materials such as rubber or rubber compounds for example. The plate portions 120, 122 are disposed on the mounting surface 108 of the base portion 40. Referring to FIGS. 2 and 3, the plate portion 120 includes apertures 130, 132, 134, 136 disposed therethrough that are aligned with the apertures 110, 112, 114, 116, respectively in the base portion 40.

Figure 1:
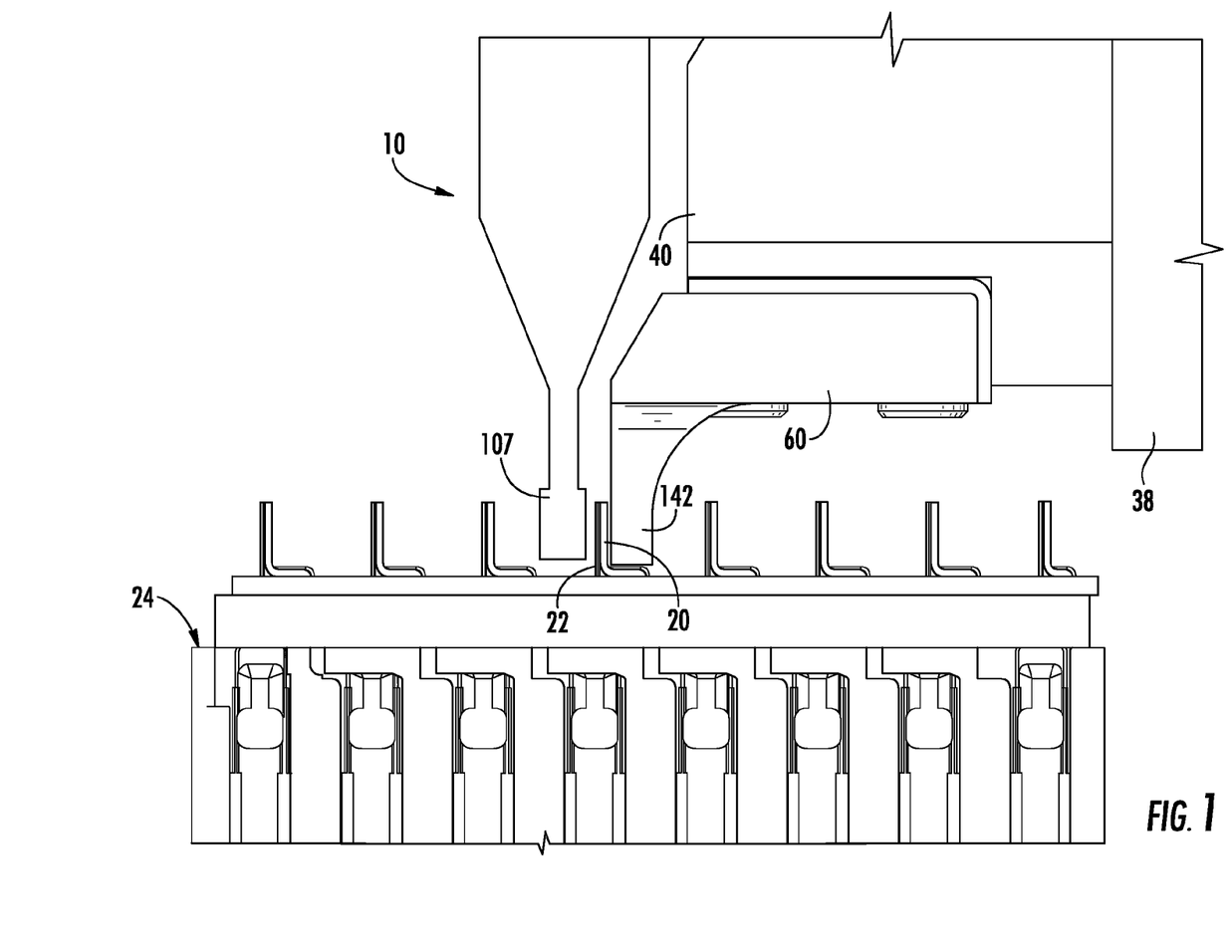
FIG. 1 is a schematic of an ultrasonic welding machine in accordance with an exemplary embodiment, and a battery module.

The anvil portion 60 is configured to be coupled to the electrically non-conductive member 50. The anvil portion 60 includes a plate member 140 and a welding head 142 that extends downwardly from the plate member 140. In one exemplary embodiment, the anvil portion 60 is constructed of steel. The plate member 140 includes apertures 150, 152, 154, 156 extending therethrough. The apertures 150, 152, 154, 156 are aligned with the apertures 130, 132, 134, 136, respectively, of the electrically non-conductive member 50. Referring to FIGS. 1 and 2, during a welding operation, the welding head 142 and the ultrasonic welding horn 107 contact an interconnect member 20 to weld interconnect member to cell tabs 22 of the battery module 24.

The electrically non-conductive tubular portions 70, 72, 74, 76 are configured to be received within the apertures 150, 152, 154, 156, respectively, of the anvil portion 60. In one exemplary embodiment, the tubular portions 70-76 are constructed of plastic. Of course, in an alternative embodiment, the tubular portions 70-76 could be constructed of other electrically non-conductive materials such as rubber or a rubber compound for example.

Referring to FIGS. 3 and 4, the bolts 100, 102, 104, 106 are provided to couple the anvil portion 60 to the base portion 40 such that the electrically non-conductive member 50 is disposed therebetween and electrically isolates the anvil portion 60 from the base portion 40. The structure of the bolts 100-106 are identical to one another and therefore only the structure of the bolts 100, 102 will be discussed in greater detail below for purposes of simplicity. The bolt 100 includes a head portion 170 coupled to a threaded end portion 172. Similarly, the bolt 102 includes a head portion 173 coupled to a threaded end portion 174.

Figure 5:
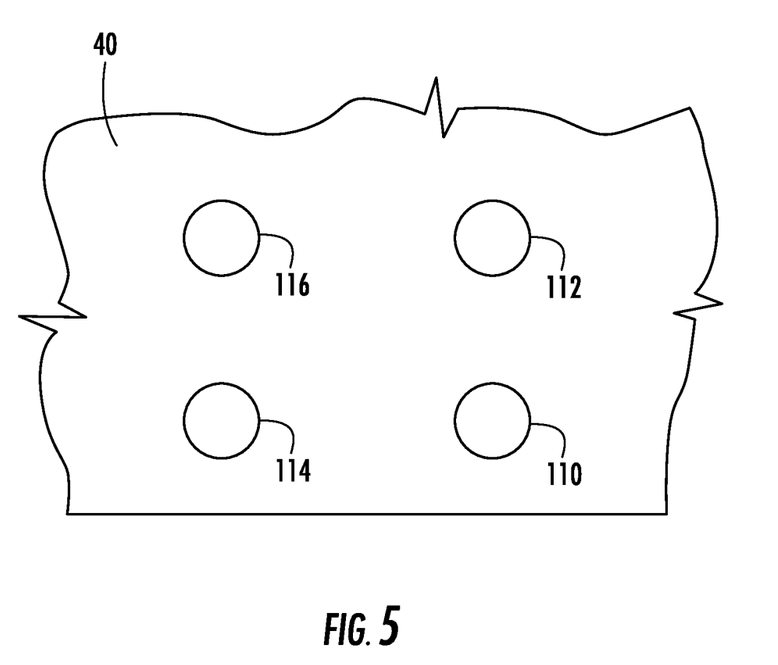
FIG. 5 is a cross-sectional view of a portion of the ultrasonic welding machine of FIG. 1.

Referring to FIGS. 3-5, during assembly, the threaded end portion 170 of the bolt 100 is disposed through the electrically non-conductive washer 90. Thereafter, the threaded end portion 170 is disposed through the aperture 150 of the anvil portion 60 and the electrically non-conductive tubular portion 70. Further, the threaded end portion 170 is disposed through the aperture 130 of the electrically non-conductive member 50 and the aperture 110 of the base portion 40 and is threadably received within internal threads 210 of the base portion 40.

Also, the threaded end portion 174 of the bolt 102 is disposed through the electrically non-conductive washer 92. Thereafter, the threaded end portion 174 is disposed through the aperture 152 of the anvil portion 60 and the electrically non-conductive tubular portion 72. Further, the threaded end portion 174 is disposed through the aperture 132 of the electrically non-conductive member 50 and the aperture 112 of the base portion 40 and is threadably received within internal threads 212 of the base portion 40.

Also, the threaded end portion of the bolt 104 is disposed through the electrically non-conductive washer 94. Thereafter, the threaded end portion of the bolt 104 is disposed through the aperture 154 of the anvil portion 60 and the electrically non-conductive tubular portion 74. Further, the threaded end portion of the bolt 104 is disposed through the aperture 134 of the electrically non-conductive member 50 and the aperture 114 of the base portion 40 and is threadably received within internal threads of the base portion 40.

Further, the threaded end portion of the bolt 106 is disposed through the electrically non-conductive washer 96. Thereafter, the threaded end portion of the bolt 106 is disposed through the aperture 156 of the anvil portion 60 and the electrically non-conductive tubular portion 76. Further, the threaded end portion of the bolt 106 is disposed through the aperture 136 of the electrically non-conductive member 50 and the aperture 116 of the base portion 40 and is threadably received within internal threads of the base portion 40.

Referring to FIGS. 3, 4, 6 and 7, a flowchart of a method for assembling a portion of the ultrasonic welding machine 10 in accordance with another exemplary embodiment will now be explained.

Figure 6:
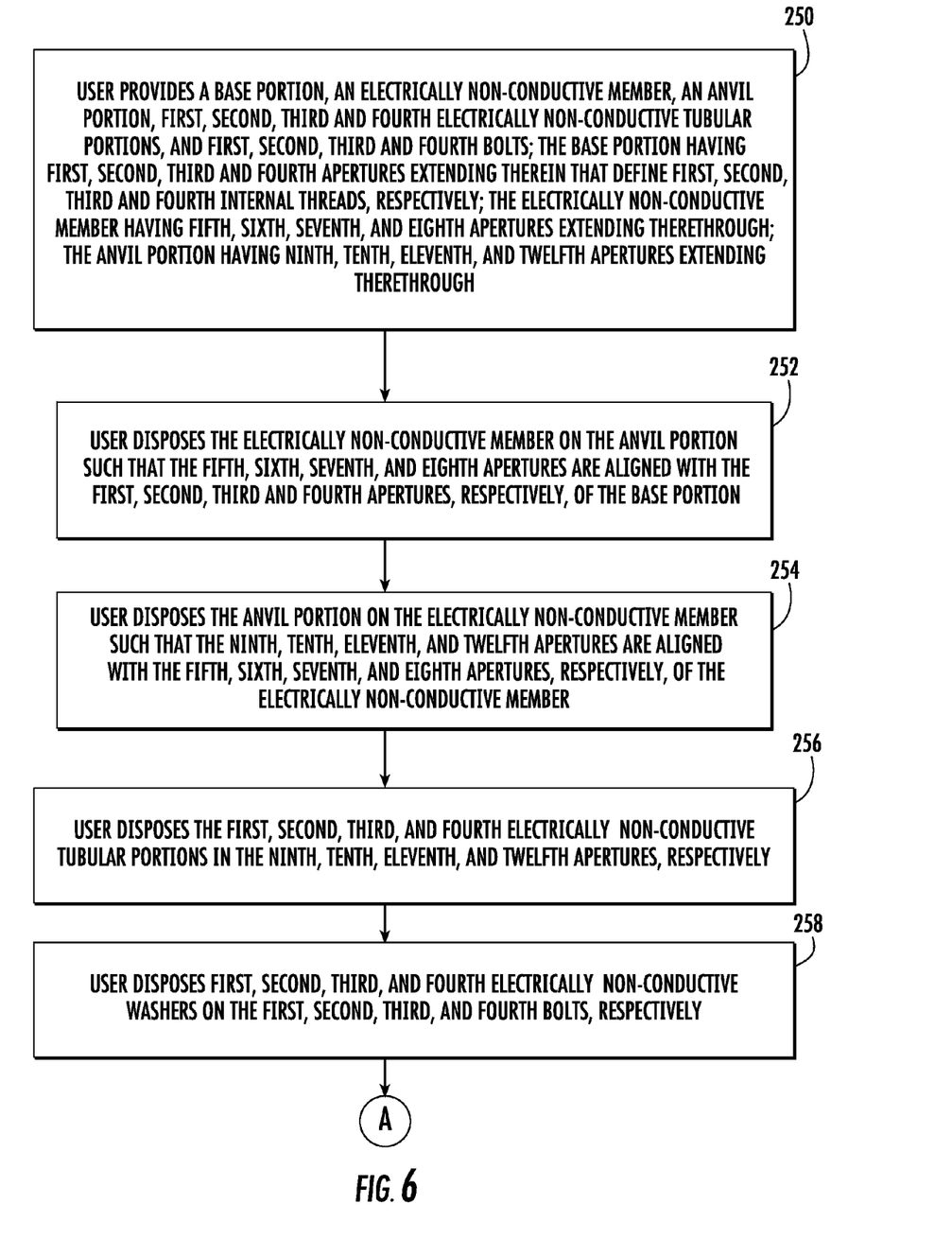
FIGS. 6 and 7 are flowcharts of a method for assembling a portion of the ultrasonic welding machine of FIG. 1 in accordance with another exemplary embodiment.

At step 250, the user provides the base portion 40, the electrically non-conductive member 50, the anvil portion 60, the electrically non-conductive tubular portions 70, 72, 74, 76, and the bolts 100, 102, 104, 106. The base portion 40 has apertures 110, 112, 114, 116 extending therein that define first, second, third and fourth internal threads, respectively. The electrically non-conductive member 50 has apertures 130, 132, 134, 136 extending therethrough, and the anvil portion 60 has apertures 150, 152, 154, 156 extending therethrough.

At step 252, the user disposes the electrically non-conductive member 50 on the anvil portion 60 such that the apertures 130, 132, 134, 136 are aligned with the apertures 110, 112, 114, 116, respectively, of the base portion 40.

At step 254, the user disposes the anvil portion 60 on the electrically non-conductive member 50 such that the apertures 150, 152, 154, 156 are aligned with the apertures 130, 132, 134, 136, respectively, of the electrically non-conductive member 50.

At step 256, the user disposes electrically non-conductive tubular portions 70, 72, 74, 76 in the apertures 150, 152, 154, 156, respectively.

At step 258, the user disposes electrically non-conductive washers 90, 92, 94, 96 on the bolts 100, 102, 104, 106, respectively.

At step 260, the user disposes the bolt 100 through the aperture 150 and the electrically non-conductive tubular portion 70 and the aperture 130 such that a portion of the bolt 100 is threadably received in the internal threads 210 of the base portion 40, and the bolt 100 and the anvil portion 60 are electrically isolated from the base portion 40.

Figure 7:
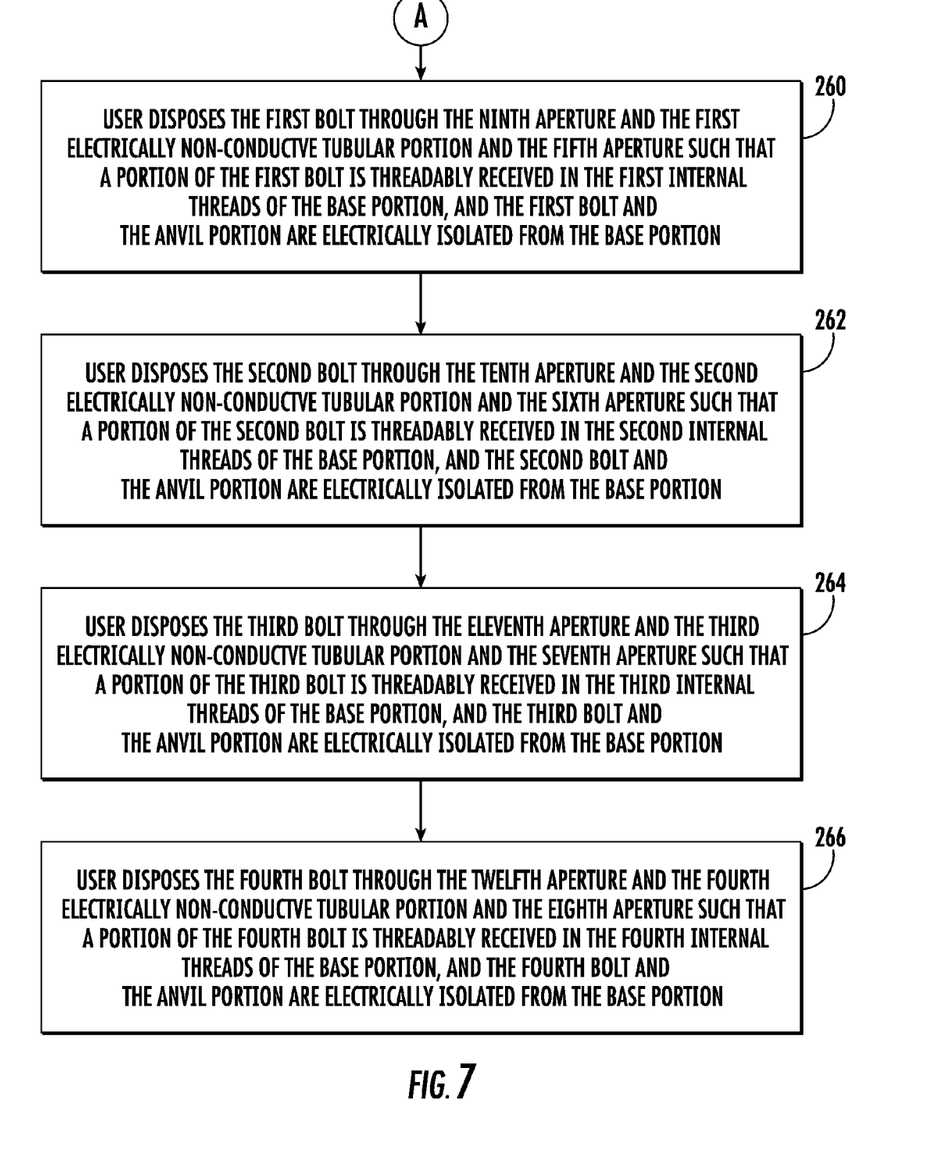

At step 262, the user disposes the bolt 102 through the aperture 152 and the electrically non-conductive tubular portion 72 and the aperture 132 such that a portion of the bolt 102 is threadably received in internal threads 212 of the base portion 40, and the bolt 102 and the anvil portion 60 are electrically isolated from the base portion 40.

At step 264, the user disposes the bolt 104 through the aperture 154 and the electrically non-conductive tubular portion 74 and the aperture 134 such that a portion of the 104 is threadably received in the respective internal threads of the base portion 40, and the bolt 104 and the anvil portion 60 are electrically isolated from the base portion 40.

At step 266, the user disposes the bolt 106 through the aperture 156 and the electrically non-conductive tubular portion 76 and the aperture 136 such that a portion of the bolt 106 is threadably received in respective internal threads of the base portion 40, and the bolt 106 and the anvil portion 60 are electrically isolated from the base portion 40.

The ultrasonic welding machine and the method of assembling a portion of the machine provide a substantial advantage over other machines and methods. In particular, the ultrasonic welding machine and the method utilize an electrically non-conductive member to electrically isolate an anvil portion from a base portion to prevent degradation of the machine when welding interconnect members to cell tabs of battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:
1. An ultrasonic welding machine, comprising:
a base portion having a first aperture extending therein that defines first internal threads of the base portion;
an electrically non-conductive member having first and second plate portions disposed on the base portion, the second plate portion being coupled to the first plate portion and extending substantially perpendicular to the first plate portion, the first plate portion having a second aperture extending therethrough that is aligned with the first aperture;

an anvil portion having a third plate portion and a welding head directly coupled to the third plate portion, the welding head extending downwardly from the third plate portion, the third plate portion disposed on the first plate portion of the electrically non-conductive member, the third plate portion having a third aperture extending therethrough that is aligned with the second aperture;

a first electrically non-conductive tubular portion configured to be received in the third aperture;

a first bolt configured to be received through the third aperture and the first electrically non-conductive tubular portion and the second aperture, and a portion of the first bolt being threadably received in the first internal threads of the base portion;

a first electrically non-conductive washer being disposed on the first bolt such that the first electrically non-conductive washer is disposed between and contacts a head of the first bolt and the third plate portion of the anvil portion;

the first bolt and the anvil portion being electrically isolated from the base portion utilizing both the first electrically non-conductive tubular portion and the first electrically non-conductive washer; and an ultrasonic welding horn disposed proximate to the anvil portion and spaced apart from the anvil portion.

2. The ultrasonic welding machine of claim 1, wherein the electrically non-conductive member is constructed of plastic.

3. The ultrasonic welding machine of claim 1, wherein the first electrically non-conductive tubular portion is constructed of plastic.

4. The ultrasonic welding machine of claim 1, wherein the first electrically non-conductive washer is further disposed between the head of the first bolt and the first electrically non-conductive tubular portion.

5. The ultrasonic welding machine of claim 1, further comprising a second electrically non-conductive tubular portion and a second bolt, wherein:

the base portion further having a fourth aperture extending therein that defines second internal threads;

the first plate portion of the electrically non-conductive member further having a fifth aperture extending therethrough that is aligned with the fourth aperture;

the third plate portion of the anvil portion further having a sixth aperture extending therethrough;

the second electrically non-conductive tubular portion configured to be received in the sixth aperture; and the second bolt configured to be received through the sixth aperture and the second electrically non-conductive tubular portion and the fifth aperture such that that a portion of the second bolt is threadably received in the second internal threads of the base portion.

6. The ultrasonic welding machine of claim 1, wherein the welding head is disposed substantially perpendicular to the third plate portion.

7. A method for assembling an ultrasonic welding machine, comprising:

providing a base portion, an electrically non-conductive member, an anvil portion, a first electrically non-conductive tubular portion, a first electrically non-conductive washer, and a first bolt, the base portion having a first aperture extending therein that defines first internal threads of the base portion, the electrically non-conductive member having first and second plate portions, the second plate portion being coupled to the first plate portion and extending substantially perpendicular to the first plate portion, the first plate portion having a second aperture extending therethrough, the anvil portion having a third plate portion and a welding head directly coupled to the third plate portion, the third plate portion having a third aperture extending therethrough, the method comprising:

disposing the first plate portion of the electrically non-conductive member on the base portion such that the second aperture is aligned with the first aperture;

disposing the third plate portion of the anvil portion on the first plate portion of the electrically non-conductive member such that the third aperture is aligned with the second aperture and the welding head extends downwardly from the third plate portion;

disposing the first electrically non-conductive tubular portion in the third aperture; and disposing a portion of the first bolt through the first electrically non-conductive washer and the third aperture and the first electrically non-conductive tubular portion and the second aperture such that a portion of the first bolt is threadably received in the first internal threads of the base portion, and the first electrically non-conductive washer being disposed between and contacts a head of the first bolt and the third plate portion of the anvil portion, and the first bolt and the anvil portion being electrically isolated from the base portion.

8. The method of claim 7, further comprising:

disposing the first electrically non-conductive washer on the first bolt such that the first electrically non-conductive washer is disposed between the head of the first bolt and the first electrically non-conductive tubular portion.

9. The method of claim 7, further comprising:

providing a second electrically non-conductive tubular portion and a second bolt;

disposing the first plate portion of the electrically non-conductive member on the base portion such that a fourth aperture in the base portion that defines second internal threads is aligned with a fifth aperture extending through the first plate portion of the electrically non-conductive member;

disposing the third plate portion of the anvil portion on the first plate portion of the electrically non-conductive member such that a sixth aperture extending through the third plate portion is aligned with the fifth aperture;

disposing the second electrically non-conductive tubular portion in the sixth aperture; and disposing the second bolt through the sixth aperture and the second electrically non-conductive tubular portion and the fifth aperture such that a portion of the second bolt is threadably received in the second internal threads of the base portion.

* * * * *